United States Patent [19]

Cosenza

[11] Patent Number: 5,228,817

[45] Date of Patent: Jul. 20, 1993

[54] LIGHTWEIGHT LOCKBOLT FASTENER SYSTEM

[75] Inventor: Frank J. Cosenza, Santa Barbara, Calif.

[73] Assignee: VSI Corporation, Chantilly, Va.

[21] Appl. No.: 950,108

[22] Filed: Sep. 23, 1992

[51] Int. Cl.⁵ .................. F16B 19/00; F16B 37/08
[52] U.S. Cl. .................. 411/361; 411/433; 411/937.2
[58] Field of Search .................. 411/1-5, 411/361, 917, 937.2, 938

[56] References Cited

U.S. PATENT DOCUMENTS

| | | | |
|---|---|---|---|
| 3,464,306 | 9/1969 | Reynolds et al. | 411/361 |
| 4,260,005 | 4/1981 | Stencel | 411/3 |
| 4,544,312 | 10/1985 | Stencel | 411/361 X |
| 4,768,910 | 9/1988 | Rath | 411/361 |
| 4,983,084 | 1/1991 | Gray | 411/361 X |
| 5,061,132 | 10/1991 | Cosenza | 411/3 |

FOREIGN PATENT DOCUMENTS

86/06448  11/1986  World Int. Prop. O. .......... 411/361

*Primary Examiner*—Neill R. Wilson
*Attorney, Agent, or Firm*—Irving Keschner

[57] ABSTRACT

An improved lockbolt fastener system wherein the pin has a threaded section with at least one axial slot to provide an anti-rotation lock. The wall of the collar has a plurality of axially extending grooves extending radially outwardly from the collar internal diameter.

11 Claims, 3 Drawing Sheets

LIGHTWEIGHT LOCKBOLT FASTENER SYSTEM

BACKGROUND OF THE INVENTION

1. Field the Invention

The present invention provides an improved lockbolt fastener system wherein the lockbolt pin has a threaded portion and at least one axial slot and the collar has a plurality of axially extending grooves in the wall wherein the collar is easily removable after installation, the grooves reducing the collar weight, the collar retaining the load and strength characteristics of conventional lock bolt fastener systems.

2. Description of the Prior Art

Lockbolt fastener systems have been long available in the prior art. For example U.S. Pat. No. 4,472,096 to Ruhl et al describes a conventional lockbolt system as comprising a pin, a collar and two workpieces. The pin has a plurality of lock grooves, the fastener typically being installed by a pull tool grasping the end of the pin, pulling the fastener such that the workpieces are clenched together, the collar then being swaged such that material flows into the pin lock grooves to form an anti-removal lock.

It has become apparent that there is a distinct need to reduce the weight of lockbolt fasteners while retaining the proper strength values. Weight reduction is desirable to the end user, particularly when used in transportation vehicles because it allows increased payload and reduced fuel usage over the lifetime of the vehicle.

In the case of aircraft in addition to the desire of using lightweight components to provide the above advantages, it is desirable that the lockbolt fastener have reduced physical characteristics (profile) for ease of accessibility.

The conventional pin lock grooves function solely to provide an anti-removal lock for the collar, the collar itself having a non-threaded internal bore. When it is necessary to remove the fastener from the workpiece to enable repair or service of aircraft components, for example, the collar must be destroyed in such a manner as to allow it to be removed freely from the pin. This is so because counter rotation torque applied to a collar that not have threads will result only in rotation of the collar but does not allow it to be removed. This procedure is cumbersome, particularly when the fastener is located in an area of restricted accessibility.

What is desired therefore is to provide a lockbolt fastener system which is lighter than those currently available, has a reduced protrusion profile and utilizes a collar that can be easily removed.

SUMMARY OF THE PRESENT INVENTION

The present invention provides a lockbolt fastener system which is lighter and smaller than currently available lockbolt systems and wherein the collar can be easily removed when required.

The pin component of the lockbolt fastener system of the present invention has a shortened threaded section with at least one axial slot to provide an anti-removal lock. The collar component has a plurality of grooves extending radially outwardly from the collar internal diameter, the material removed to form the grooves reducing the weight of the collar while not lessening the strength thereof. When the collar is swaged on the threaded portion of the pin, a portion of the flowing material is forced into the axial slot. This material now acts as an effective lock to prevent the inadvertent removal of the collar from the pin and also forms a mating threaded section with the threads on the pin. When it becomes necessary to remove the collar from the pin a torque load is applied to the collar sufficient enough to shear through the material imbedded in the axial slot, the threads on the pin and the mating threaded section operating in a conventional manner when the collar is loosened.

The lockbolt fastener of the present invention as a result has a lower protrusion profile than comparable lockbolt fasteners with the same load requirements. The design of the collar is shorter than comparable collars, requires less installation load, is easily removed and is lightweight.

DESCRIPTION OF THE DRAWING

For a better understanding of the invention as well as other objects and further features thereof, reference is made to the following description which is to be read in conjunction with the accompanying drawing wherein.

DESCRIPTION OF THE INVENTION

Figure 1:
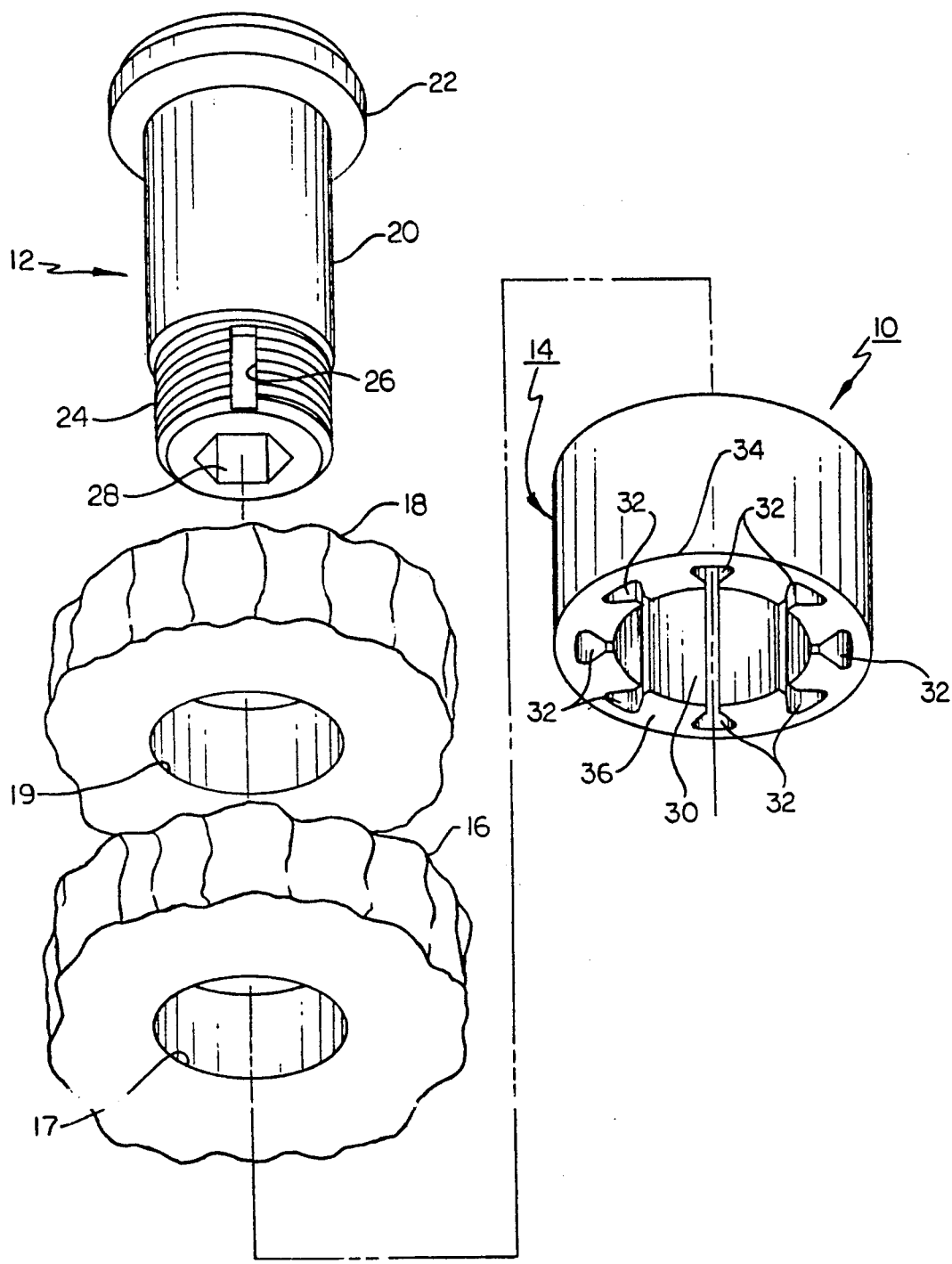
FIG. 1 is an exploded perspective view of the fastener of the present invention.

Referring to FIG. 1, the two piece fastener 10 of the present invention is illustrated. Fastener 10 comprises a pin 12 and collar 14, fastener 10 joining workpieces 16 and 18. Workpiece 16 has an aperture 17 therethrough and workpiece 18 has aperture 19 therethrough. As used hereinafter, "fastener system" includes pin 12, collar 14 and workpieces 16 and 18.

Specially designed lock bolt pin 12 includes a shank portion 20 of nominal diameter having a head 22 at one end and a threaded portion 24 at the other end, threaded portion 24 having a slot 26. formed therein, slot 26 extending parallel to the axis of pin 12. Threaded portion 24 has a preselected longitudinal dimension, or height, and thread configuration. A hexagonal shaped drive recess 28 is provided for receiving a tool to hold the fastener during collar removal, recess 28 being formed at the end of threaded portion 24. The recess 28 also enables the overall weight of fastener 10 to be reduced.

Figure 3:
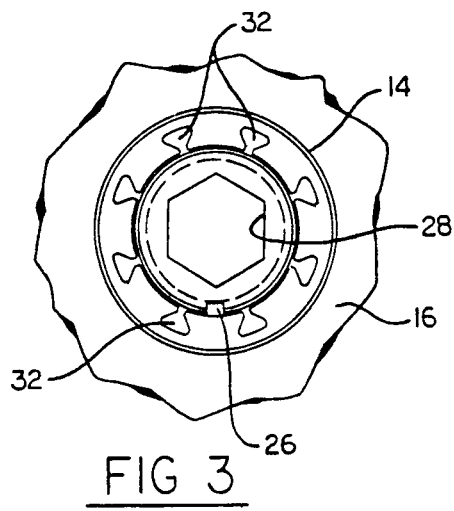
FIG. 3 is a plan view of the fastener shown in FIG. 2.
Figure 2:
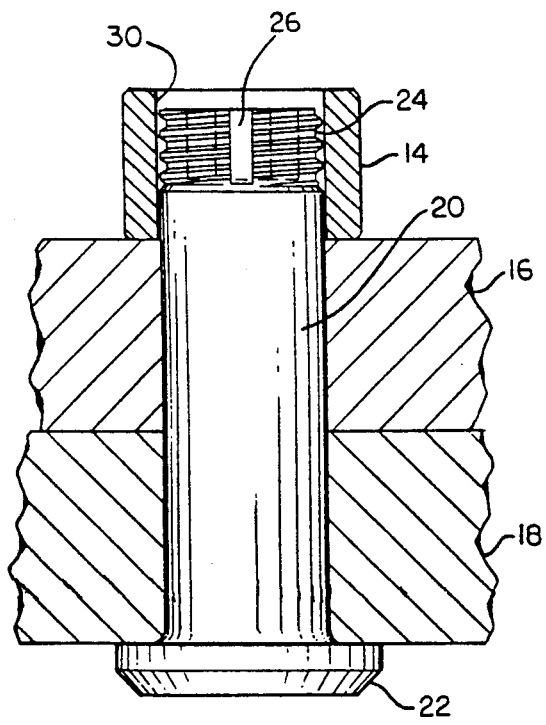
FIG. 2 is a view showing the fastener prior to being set or swaged.
Figure 6:
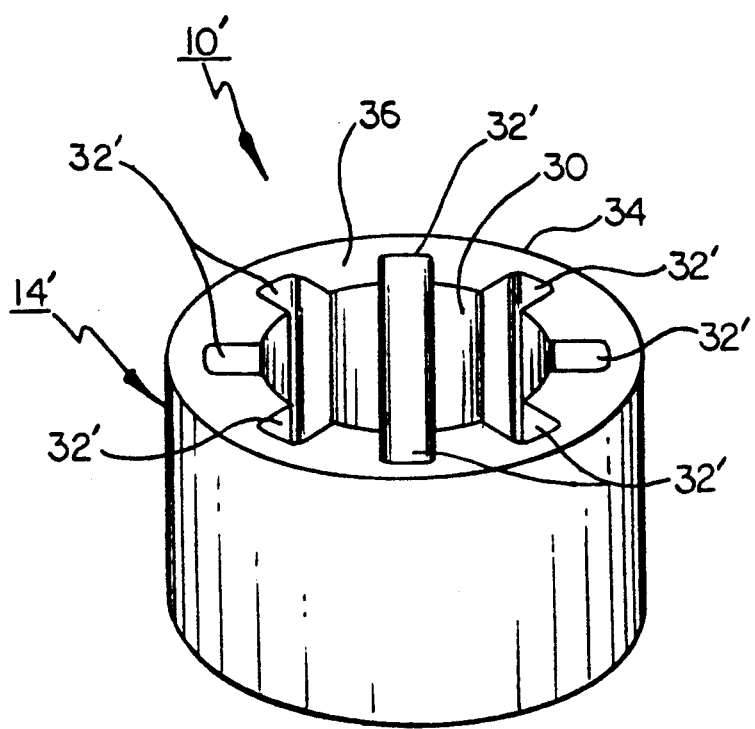
FIG. 6 is a perspective view of another configuration of the collar grooves.

Specially designed collar 14 has a smooth internal bore, or diameter, 30, the internal diameter 30 and the collar external diameter 34 forming wall portion 36. A plurality of grooves, or slots, 32 are formed in wall 36 of collar 14 and extend, in the preferred embodiment, along the entire wall height in a direction coaxial with the longitudinal of collar 14. Grooves 32 extend radially from the internal diameter 30 and may enlarge in size as it approaches external diameter 34 for additional weight savings as shown in FIGS. 1-3. Although eight grooves are illustrated, the number of grooves can vary, the only requirement being that the desired strength characteristic not be compromised. The shape of grooves 32 can also be varied (FIG. 6 shows one such alternative wherein the grooves 32' radiate outwardly as rectangularly shaped slots), it being preferred that the groove cross-sectional area be greatest at a location furthest away from internal diameter 30.

Figure 5:
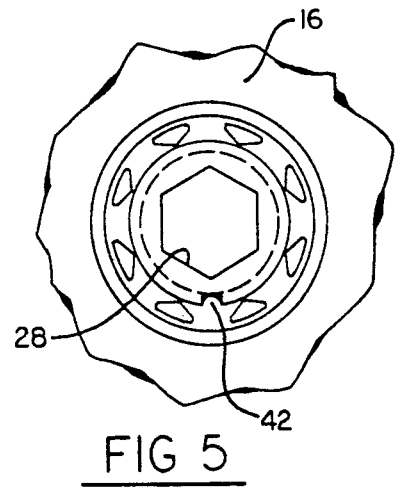
FIG. 5 is a plan view of the fastener shown in FIG. 4.
Figure 4:
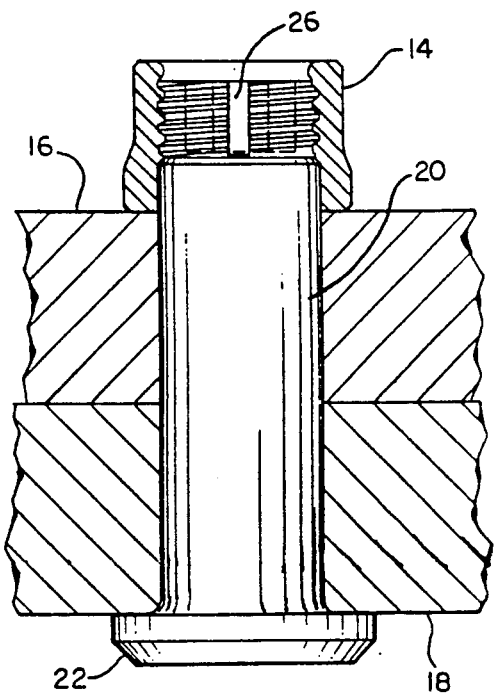
FIG. 4 is a view similar to FIG. 1 but showing the fastener thereof in a finally set or swaged condition.

To set, or swage, fastener 10, pin 12 is inserted through openings 17 and 19 in workpieces 16 and 18, respectively, and collar member 14 disposed over the threaded shank portion 24 as shown in FIG. 2 and 3. A conventional tool, not shown, is disposed over collar 14 and appropriate forces applied whereby collar 14 is swaged into slot 26 as shown in FIGS. 4 and 5.

In accordance with the teachings of the present invention, the internal diameter 30 of collar 14 has threads formed thereon during the swaging process which mate with the threads on the threaded section 24. In particular, collar material is formed in each root of the threaded shank portion 24, the formed collar material and the corresponding shank portion being in threaded engagement thus forming a conventional bolt/nut threaded function. To prevent collar 14 from loosening, a flowing material 42 is forced into axial slot 26 when collar 14 is swaged onto threaded shank portion 24. This material now acts as an effective lock to prevent the inadvertent removal of collar 14 from pin 12. Grooves 32 are deformed during the swaging process and take the shape shown in FIG. 5.

When it becomes necessary to remove collar 14 from pin 12, a hexagon tool is placed in recess 28 to prevent rotation of the fastener a torque load then being applied to the collar sufficient enough to shear through the material imbedded in axial slot 26, collar 14 then being threadedly disengaged from threaded portion 24.

Although only one axial slot is illustrated, additional slots can be utilized limited only to the extent that the strength of the fastener is sufficient to meet the torque-off load requirements.

The present invention thus provides a lock bolt fastener that has a lower protrusion profile than any existing fastener now commercially available with the same load requirements (typical prior art lock grooves and collar heights are approximately 40 percent greater in length than threaded portion 24 and the height of collar 14), has a reduced weight by virtue of drive recess 28 and grooves 32, and enables the collar to be removed easily when required by virtue of the pin/collar threaded engagement, features which provide significant advantages over existing lock bolt fasteners currently commercially available.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is

1. A fastener system comprising a fastener pin having a longitudinal axis, a head and a threaded portion, said threaded portion extending through aligned openings in said first and second workpieces to be secured together, and a collar of predetermined height having internal and external diameters, said collar being disposed over said threaded portion and having an initially unthreaded internal diameter, said threaded portion having at least one slot formed therein and extending in a direction substantially coaxial to the longitudinal axis of said pin and along substantially the entire length thereof, and first and second means for locking said collar against counterrotation; said first locking means being provided when said collar is swaged onto the threaded portion of said pin whereby collar material is caused to flow and set in said axial slot to lock said collar against conuterrotation and wherein said second locking means is provided when collar material is formed in each root of said threaded portion whereby the internal diameter of said collar is in threaded engagement with the corresponding mating threaded portion after swaging.

2. The fastener system of claim 1 wherein the wall portion formed between the internal and external diameters of said collar has a plurality of grooves formed therein.

3. The fastener system of claim 2 wherein said grooves extend substantially along the entire height of said collar.

4. The fastener system of claim 1 wherein a drive recess is formed in the threaded shank portion of said pin.

5. The fastener system of claim 1 wherein said collar is threadably removable from said pin.

6. The fastener system of claim 1 wherein said pin includes an unthreaded shank portion having said head at a first end and said threaded portion at a second end, said threaded portion having threads along its entire length, a first end of said threaded portion abutting said second end of said shank portion.

7. The fastener system of claim 1 wherein said threaded portion has only one slot formed therein extending in a direction substantially coaxial to the longitudinal axes of said pin and along substantially the entire length thereof.

8. A combination of a swagable collar having internal and external diameters and a threaded pin for joining two workpieces together, the collar being of the type when swaged the material therefrom flows into areas on the pin to develop an axial lock between the pin and collar, the improvement comprising a plurality of grooves formed in the wall portion between the internal and external diameters of said collar.

9. The improvement of claim 8 wherein the grooves extend substantially along the entire height of said collar.

10. The improvement of claim 8 wherein the longitudinal cross-sectional area of each groove adjacent the collar external diameter is greater than the groove longitudinal cross-sectional area adjacent the internal diameter of said collar.

11. A fastener system comprising a fastener pin having a longitudinal axis, a head and a threaded portion, said threaded portion extending through aligned openings in first and second workpieces to be secured together, and a collar of predetermined height having internal and external diameters, said collar being disposed over said threaded portion, said threaded portion having at least one slot formed therein and extending in a direction substantially coaxial to the longitudinal axis of said pin, and means for locking said collar against counterrotation, the wall portion formed between the internal and external diameters of said collar having a plurality of grooves formed therein, said grooves extending substantially along the entire height of said collar, the longitudinal cross-sectional area of each groove adjacent the collar eternal diameter being greater than the groove longitudinal cross-sectional area adjacent the internal diameter of said collar.

* * * * *

UNITED STATES PATENT AND TRADEMARK OFFICE
CERTIFICATE OF CORRECTION

PATENT NO. : 5,228,817

DATED : July 20, 1993

INVENTOR(S) : Frank J. Cosenza

It is certified that error appears in the above-identified patent and that said Letters Patent is hereby corrected as shown below:

Column 4:

On lines 5-6, "conuterrotation" should read —counterrotation—.
On line 65, "eternal" should read —external—.

Signed and Sealed this

Fifteenth Day of February, 1994

Attest:

BRUCE LEHMAN

Attesting Officer    Commissioner of Patents and Trademarks